Patented Oct. 3, 1939

2,174,543

UNITED STATES PATENT OFFICE 2,174,543

METHOD OF PRODUCING YEAST

Roger J. Williams, Corvallis, Oreg., assignor to Standard Brands Incorporated, New York, N. Y., a corporation of Delaware No Drawing. Application June 26, 1937, Serial No. 150,543

5 Claims. (Cl. 99—90)

This invention relates to the culturing of yeast and has for its object the provision of a specific nutrient and method for stimulating yeast growth.

Yeasts are produced commercially by growth of cultures of the desired types in media which provide the necessary food materials to nourish the growing plants. Among the media used are solutions made from grain mashes, beet molasses, cane molasses and the like, to which supplemental materials such as ammonia or ammonium compounds, phosphates or other mineral substances have been added in certain cases. Synthetic media containing sugars and salts may also be employed for yeast culture. After the yeast plants have grown and increased in amount and numbers, they are separated from the medium and further treated to produce either a wet or dry product, which may itself be used as a food ingredient or for the production of fermentation products in other media or for leavening as in bread making. In some cases as in brewing and distilling and wine making etc., the yeast crop itself may be without much value but its propagation in the medium is necessary for producing the desired amount of fermentation products.

I have discovered that the rate of growth of yeast plants is accelerated and the total crop is increased by the addition to the media of a specific organic compound, namely ethanolamine which is sometimes called cholamine. Ethanolamine is a simple well-known organic base and has been given the formula $C_2H_7ON$. Salts of this base or other derivatives which under the conditions existing in the medium would yield it or its salts are considered to be the equivalent of ethanolamine.

In a series of controlled tests which were run under different sets of conditions the increase in growth obtained by the addition of ethanolamine as a nutrient amounted to 30%, 40%, 18%, 49%, 60%, 53%, 62%, 7.3%, 10%, 11%, 9%, 7%, 12%, 5.3%, 5.5%, 7%, 3.7%, 8.8% respectively. In these experiments three different sources of yeast were used, the seedings were varied over a wide range, three different beet molasses media and one synthetic medium were used and the cultures were grown with and without agitation. The larger increases were noted when the yeast seeding was small. The significant fact is that in every case there was an increased crop due specifically to the addition of ethanolamine. When an overdose of ethanolamine was used the crop was decreased. In the experiments cited about one part of ethanolamine per 12,000 parts of culture medium often gave best results. This, however, is cited as an example and not as a limitation of the invention because under some conditions more or less than this amount seemed favorable.

Addition of ethanolamine may be used to accelerate the growth, increase the yield or modify the quality of yeast in cultures, for the production of yeast itself, or it may be added to batches or solutions or mixtures in which yeast growth functions to bring about desired chemical or physical reactions such as in the fermentation process for alcohol production or in the leavening of bread.

I claim:

1. A nutrient medium for yeast which comprises a yeast assimilable carbohydrate material, a yeast nutrient inorganic salt and a small amount of ethanolamine sufficient to effect an increase in yeast activity.

2. A method for stimulating activity and increasing the yield of yeast which comprises preparing a nutrient medium containing yeast assimilable carbohydrate material, a yeast nutrient inorganic salt and ethanolamine in the ratio of about 1 part to about 12,000 parts, incorporating the yeast with said medium, and allowing the yeast to act therein.

3. A method for stimulating activity and increasing the yield of yeast which comprises preparing a nutrient medium containing a yeast assimilable carbohydrate material, a yeast nutrient inorganic salt, and ethanolamine in the ratio of about 1 part to about 12,000 parts, seeding said nutrient medium with yeast, propagating the yeast therein with aeration, and separating yeast from the medium.

4. A nutrient medium for yeast which comprises a yeast assimilable material and a small amount of ethanolamine sufficient to effect an increase in yeast activity.

5. A method for the production of bread, which comprises stimulating the activity of yeast in a dough batch by incorporating a small amount of ethanolamine sufficient to effect an increase in yeast activity with flour, water, yeast, sugar and other ingredients entering into the preparation of a dough, forming into a dough, and subsequently baking.

ROGER J. WILLIAMS.